US005108080A

United States Patent [19]

James

[11] Patent Number: 5,108,080

[45] **Date of Patent: * Apr. 28, 1992**

[54] MACHINE TOOL VISE

[76] Inventor: Lawrence W. James, 9769 W. Fairview, Littleton, Colo. 80123

[*] Notice: The portion of the term of this patent subsequent to Jul. 23, 2008 has been disclaimed.

[21] Appl. No.: 630,154

[22] Filed: Dec. 19, 1990

Related U.S. Application Data

[63] Continuation-in-part of Ser. No. 418,391, Oct. 6, 1989, Pat. No. 5,033,729.

[51] Int. Cl.[5] .............. B23Q 3/02

[52] U.S. Cl. .............. 269/136; 269/244; 269/258; 269/266; 269/154; 269/156

[58] Field of Search .............. 269/152, 154, 155, 156, 269/258, 294, 219, 221, 139, 164, 109, 111, 113, 114, 118, 190, 262, 901, 136, 266, 267, 270, 279–283

[56] References Cited

U.S. PATENT DOCUMENTS

| | | | |
|---|---|---|---|
| 449,987 | 4/1981 | Wies . | |
| 910,937 | 1/1909 | Miller | 269/152 |
| 1,203,152 | 10/1916 | Steudner . | |
| 2,724,296 | 11/1955 | Parrish et al. . | |
| 2,948,172 | 8/1960 | Sloboda et al. | 269/283 |
| 3,103,353 | 9/1963 | Lassy | 269/267 |
| 3,995,805 | 12/1976 | Gersbacher | 269/267 |
| 4,098,500 | 7/1978 | Lenz . | |
| 4,299,146 | 11/1981 | Phelps . | |
| 4,509,731 | 4/1985 | Schaal et al. | 269/283 |
| 4,519,592 | 5/1985 | Russell | 269/283 |
| 4,632,375 | 12/1986 | Yang . | |
| 4,648,585 | 3/1987 | Yang . | |
| 4,824,085 | 4/1989 | Buchler . | |
| 5,033,724 | 7/1991 | James | 269/136 |

*Primary Examiner*—Robert C. Watson
*Attorney, Agent, or Firm*—Dorr, Carson, Sloan, & Peterson

[57] ABSTRACT

An improved machine vise, particularly well suited for use on milling machines and the like, having an improved arrangement for securely holding workpieces of irregular shapes or several different, diversely sized workpieces simultaneously. The vise is provided with a fixed jaw and two movable jaws mounted in a side by side relationship such that each jaw is free to move back and forth into and out of a gripping relationship with the object being clamped. The two movable jaws are yoke driven on a shaft such that a single forward thrust of the yoke exerts a forward and downward pressure to move both jaws forward while at the same time allowing for a translational motion between said adjacent jaws. These jaws can thus simultaneously grip and secure individual workpieces of different dimensions or differently sized portions or cross-sections of the same workpiece. Each jaw may also be provided with individually mounted fingers that pivot into the best gripping relationship with the object being clamped. A multiplicity of gripping fingers are thereby set in gripping engagement with a workpiece by a single operation of the vise. An arrangement for exerting a downward pressure on the yoke is also provided. Thus, this vise is capable of clamping a workpiece in all three axes (face, ends and top) or any combination thereof. It is also possible to totally enclose the workpieces or any desired portion thereof. This vise is likewise capable of securely holding workpieces made of either hard or relatively soft materials.

14 Claims, 7 Drawing Sheets

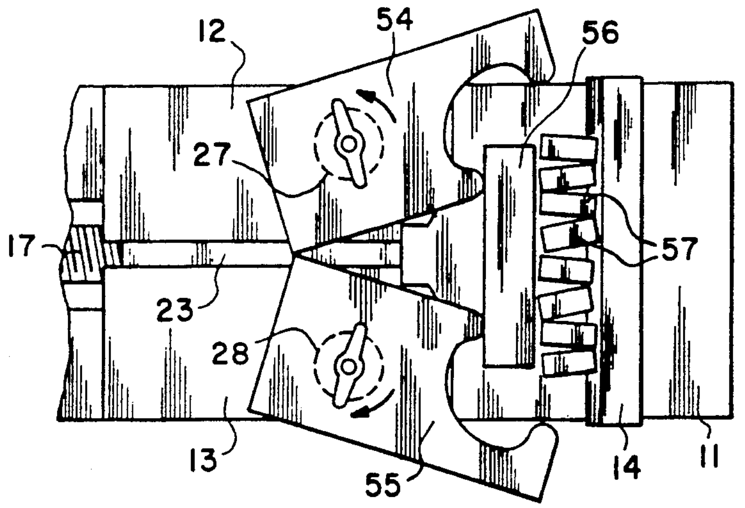
Fig. 14
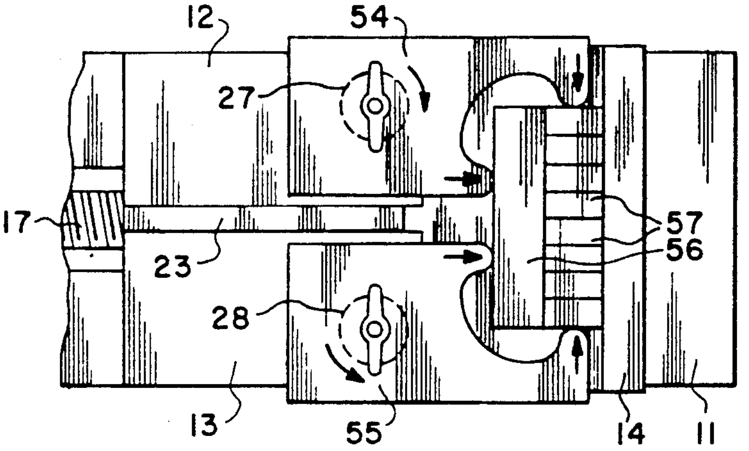
Fig. 15
Fig. 16
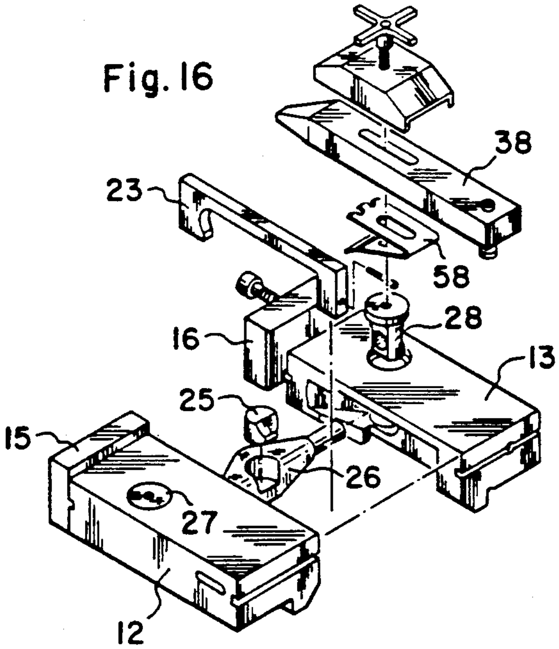
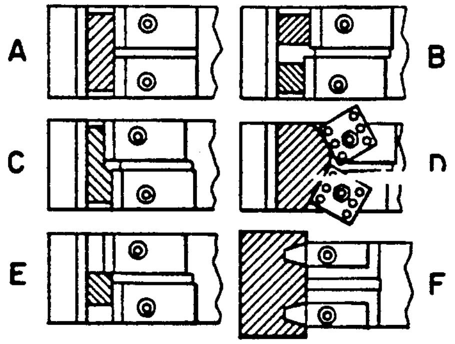
Fig. 17

MACHINE TOOL VISE

RELATED APPLICATION

The present application is a continuation-in-part of the inventor's copending U.S. patent application Ser. No. 07/418,391, filed on Oct. 6, 1989 now U.S. Pat. No. 5,033,724.

BACKGROUND OF THE INVENTION

1. Field of the Invention

This invention relates to machine tool vises and the like and particularly to an improved machine vise for holding workpieces of regular or irregular configuration. The vise of this invention is capable of holding several separate workpieces at the same time. A further advantage is that a single jaw closing mechanism may be employed for gripping a plurality of diversely dimensioned workpieces to hold them in rigid positions with respect to one another.

2. Discussion of Prior Art

It is old and well known in the machine vise art to have articulated jaws that can adjust about a pivotal axis to accommodate diversely shaped objects. Jaws of this type are disclosed in the patent to Yang, U.S. Pat. No. 4,648,585. In this reference, the pivoting jaws 1002 are fixed at one end of the vise and a reciprocating plate 1001 moves towards and away from the jaws to clamp an object therebetween. The pivoting jaws cannot reciprocate back and forth themselves in this reference as they are fixedly attached to one end of the vise.

The patent to Yang, U.S. Pat. No. 4,632,375, discloses another type of articulated jaws 1 that are moved into and out of engagement with the object being clamped. As shown in FIGS. 2-10, each of the jaws 1 are individually, pivotally mounted such that the jaws can automatically adjust and pivot into the best gripping relationship with the object being clamped. However, unlike the present invention, each pair of pivoting jaws are mounted together on a single track in a side by side relationship such that both jaws must move back and forth together. In the embodiment shown in FIGS. 54 and 55, a ball joint 25 and 26 on the end of the threaded shaft permits rotation of the jaws about the ball joint, but does not maintain lateral positioning of the jaws. In contrast, each pivoting jaw of the present invention is mounted on an individual track such that the jaws can also move translationally with respect to each other, while maintaining a constant lateral positioning.

SUMMARY OF THE INVENTION

This invention is directed toward a machine vise that comprises one fixed jaw and two movable jaws mounted in a side by side relationship opposite from the fixed jaw. Each jaw is mounted such that it is free to move back and forth, on independent tracks, into and out of a gripping relationship with the object being clamped. By mounting the jaws on parallel tracks, any lateral movement of the jaws towards or away from one another is constrained such that the jaws will always move parallel to each other. A central yoke driven on a threaded shaft serves to move both jaws at once while at the same time allowing for a translational motion between adjacent jaws. Because the jaws are mounted on parallel tracks there is maintained a constant lateral spacing of one jaw from the other at all times. The yoke comprises a cylindrical member having a slanted face that engages the slanted face of the headpiece on the end of the threaded drive shaft to drive the yoke and thus the jaws forward in response to the motion of the drive shaft. The slanted face of the headpiece also exerts a downward force on the yoke and movable jaws as the workpiece is engaged. In addition, each jaw may be provided with a pivotally mounted finger or plate or other fitting that can pivot into the best gripping relationship with the object being clamped.

It is an object of this invention to provide an improved vise particularly for use on milling machines and the like having an improved arrangement for securely holding workpieces of irregular or odd shapes.

It is another object of this invention to provide an improved machine vise having a multiplicity of gripping jaws or fingers which may be set in gripping engagement with a workpiece by a single operation of the vise.

It is another object of this invention to provide a machine vise capable of simultaneously gripping and securing in side by side relationship workpieces of different dimensions or different sized parts of the same workpieces.

It is a further object of this invention to provide an improved machine vise that is capable of securely holding workpieces of both hard and relatively soft materials with multiple points of contact and multiple directions of pressure.

It is another object of this invention to provide an improved machine vise constructed and arranged to apply a single forward thrust to a pair of independently movable jaws to apply a forward and downward pressure on both jaws.

The features of novelty which characterize this invention are pointed out with particularity in the claims annexed to and forming a part of this specification. The invention itself, however, both as to its organization and manner of operation, together with further objects and advantages thereof may be best understood upon reference to the following description taken in connection with the accompanying drawings the figures of which are described briefly as follows:

DESCRIPTION OF THE DRAWING

FIG. 14 is a plan view showing the vise being utilized to clamp small workpieces in readiness for machining by using diverse clamps 54 and 55.

FIG. 15 is a plan view of the small workpieces in FIG. 14 tightly clamped in position by said vise.

FIG. 16 is an exploded assembly drawing of this invention including the spring-loaded finger clamps.

FIGS. 17A-17F are plan views showing the versatility of the vise in that it is capable of clamping objects of any shape. Fittings that securely clamp angular or irregularly shaped workpieces are shown in FIG. 17D while the spring-loaded finger clamps have been illustrated in FIG. 17F.

DETAILED DESCRIPTION OF THE INVENTION

Figure 1:
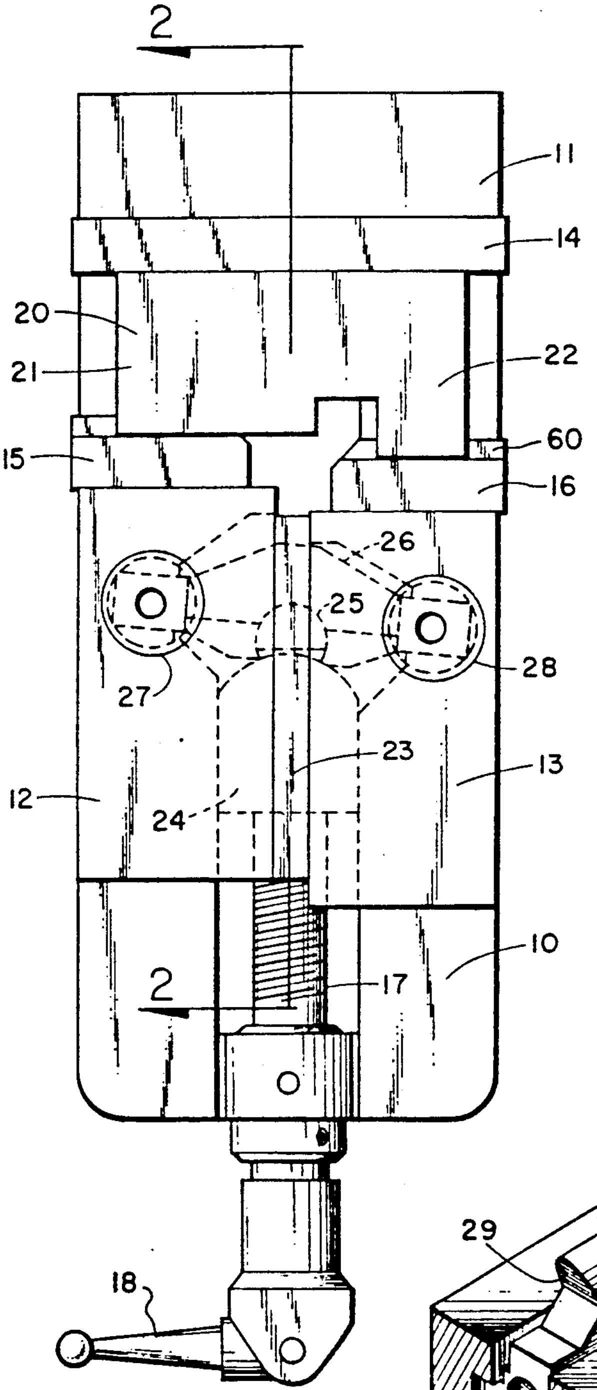
FIG. 1 is a plan view of a machine vise embodying the invention.

Referring now to the drawings, FIG. 1 is a plan view of a machine vise having a base 10, a fixed jaw 11 at the far end, and a pair of removable sliding jaws 12 and 13. The fixed jaw 11 has a face plate 14 and the sliding jaws 12 and 13 have been provided with face plates 15 and 16 respectively.

The movable jaws 12 and 13 are rectangular in shape with longitudinal steps or notches cut into the base thereof. These steps or notches accommodate the two parallel tracks of the base upon which they slide. By mounting the jaws on parallel tracks, any lateral movement of the jaws towards or away from one another is constrained such that the jaws will always move parallel to each other. As shown in the cut away view of FIG. 4, each jaw 12, 13 has an inset that accommodates the headpiece 24 and the yoke 26. The yoke comprises a cavity centrally positioned between two cylindrical arms that extend into openings provided in jaws 12 and 13. This central cavity supports a removable, rotatable cylindrical member 25 having a slanted face 25a that engages the slanted face of headpiece 24 to drive the yoke and thus the jaws forward in response to the motion of a drive shaft 17. The two cylindrical arms extend into cylindrical openings provided in pistons 27 and 28, each piston being slidably positioned in the circular openings provided in each of the jaws 12 and 13

The movable jaws 12 and 13 are reciprocated by the operation of the screw threaded drive shaft 17 having a handle 18. In FIG. 1, an irregularly shaped workpiece 20 is illustrated in position between the fixed face plate 14 and movable face plates 15 and 16. The workpiece is of a modified L-shape with a portion 21 of lesser width at its left end in engagement with the face plate 15 and a wider portion 22 on its right hand end in engagement with the face plate 16.

Figure 2:
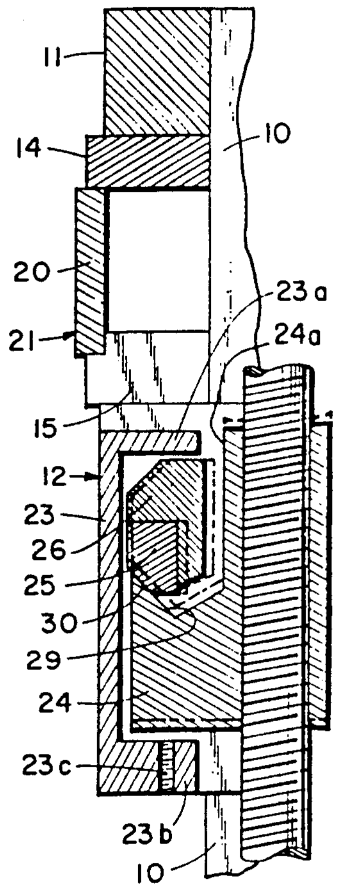
FIG. 2 is a sectional view of the vise of FIG. 1 taken along line 2—2 of FIG. 1.
Figure 3:
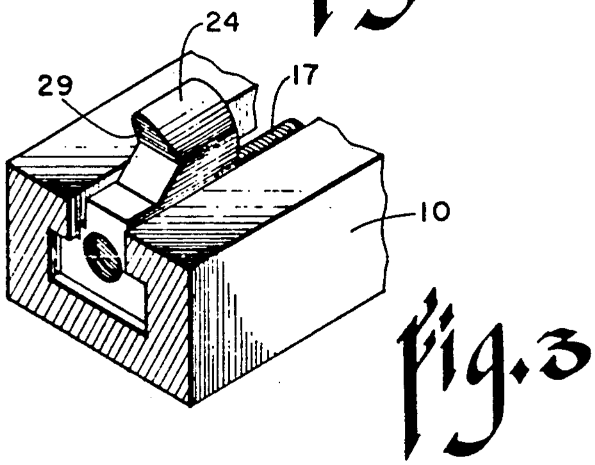
FIG. 3 is a three dimensional, perspective view of the headpiece 24 mounted upon and driven by shaft 17.

A spacer 23 having legs 23a and 23b, as shown in FIGS. 1 and 2, is provided between the jaws 12 and 13 to maintain the alignment of the jaws and to prevent any yawing movement of the jaws towards one another. In addition, as stated above, by mounting the jaws on parallel tracks, any lateral movement of the jaws towards or away from one another is constrained such that the jaws will always move parallel to each other. Spacer 23 serves to further insure the parallel movement of the jaws 12 and 13 at all times while also retracting the moveable jaws. A set screw 23c is provided in the leg 23b of the spacer 23 to maintain the headpiece 24 in position between the legs 23a and 23b of the spacer.

Figure 4:
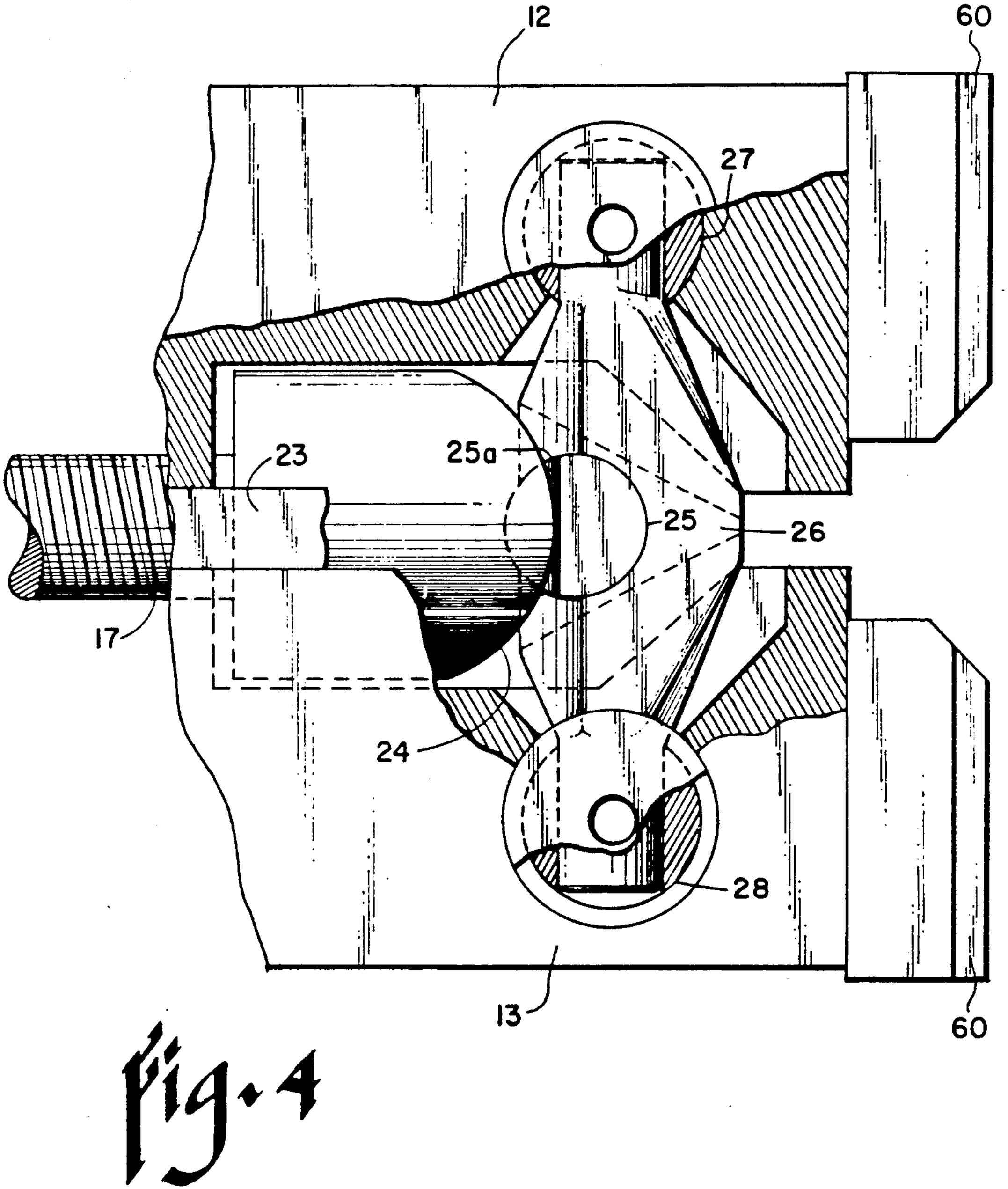
FIG. 4 is an enlarged plan view of a portion of the vise illustrated in FIG. 1 with portions of the movable jaws broken away to show the headpiece engaging the yoke that in turn engages the pistons provided in each jaw.
Figure 5:
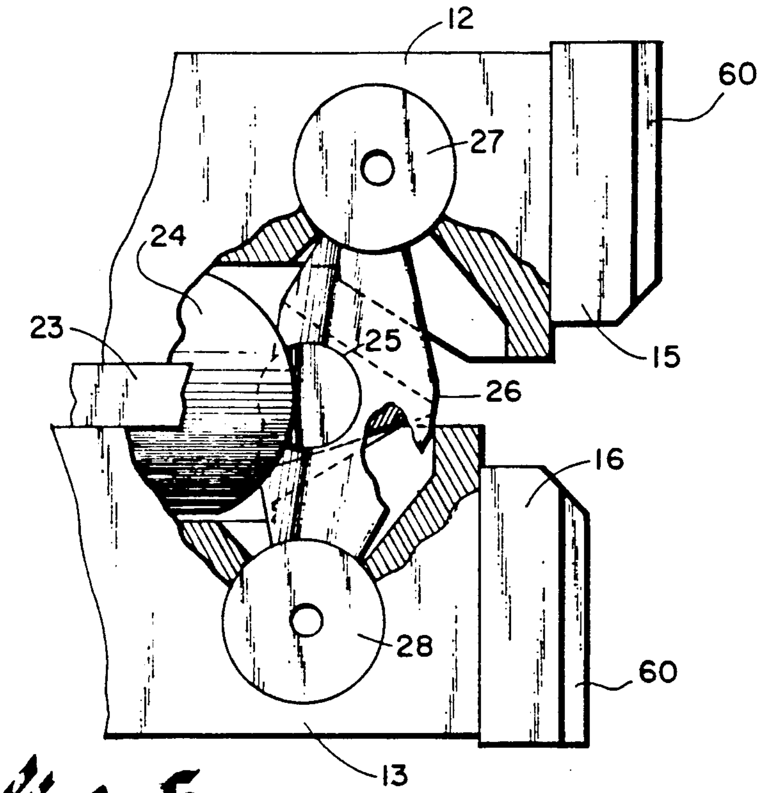
FIG. 5 is a view similar to FIG. 4 showing the yoke rotated slightly toward the right.
Figure 6:
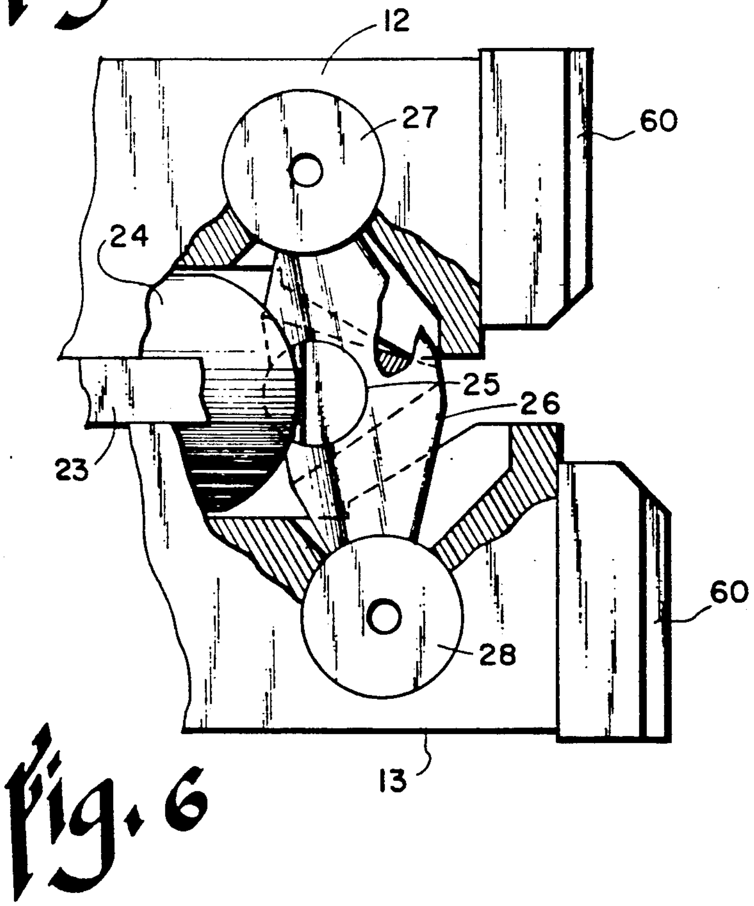
FIG. 6 is a view similar to FIG. 5 illustrating the yoke rotated slightly to the left.

In FIG. 1, the jaws 12 and 13 are shown in their fixed positions with the vise closed against the workpiece 20. As illustrated, the face plates 15 and 16 on jaws 12 and 13, respectively, have been tightened against portions 21 and 22 of the workpiece 20 thereby securely holding the workpiece 20 between the face plate 14 and the face plates 15 and 16. Pressure is exerted by the vise via drive shaft 17 through headpiece 24 that is pressed against the cylindrical member 25 in the yoke assembly 26 as shown in FIGS. 1 and 4. The yoke 26 is pivotally and slidably mounted in pistons 27 and 28 provided in jaws 12 and 13, respectively. The yoke 26 is clearly illustrated in FIGS. 5 and 6. These figures illustrate the extreme positions of the yoke with jaw 12 being forwardly advanced in FIG. 5 and jaw 13 being forwardly advanced in FIG. 6. From the foregoing, it will be apparent that when a workpiece is positioned against the fixed jaw 14 and the jaws are advanced toward the workpiece, they will advance together until either or both jaws meet the workpiece. If the workpiece is of uniform width, the jaws will be horizontally aligned such that the yoke extends perpendicularly from the drive shaft 17 (see FIG. 4). However, if the workpiece has widths of diverse dimensions, as illustrated in FIG. 1, the jaws 12 and 13 will advance until one jaw 13 strikes the workpiece 20. Thereafter, further advance of the drive shaft 17 will bring the other jaw 12 into engagement with the other end 21 of the workpiece 20. FIGS. 4, 5 and 6 thus illustrate three different conditions created by diversely shaped workpieces and illustrate the manner in which the yoke 26 operates to bring both jaws 12 and 13 into engagement with the workpiece whereupon further tightening of the jaws brings equal pressure to bear on both portions of each workpiece.

As shown in FIG. 2, the headpiece is somewhat J-shaped in cross-section with a flat base 24 that supports yoke 26. The headpiece 24 has a downwardly sloping face 29 that engages the upwardly sloping face 30 of the cylindrical member 25 as shown in FIG. 2. Thus, when screw threaded drive shaft 17 drives headpiece 24 forward, the yoke 26 is urged downwardly and the jaws 12 and 13, in turn, are pressed against the base of the vise. A downward position of the yoke is indicated by the dotted lines in FIG. 2. This downward thrust of the yoke 26 effects a downward pressure on the pistons 27 and 28 that, in turn, exert a downward motion and pressure when holding a workpiece on top of the vise. This is a particularly effective means for holding some relatively thin workpieces by eliminating the bowing or bending of said thin workpieces due to side pressure.

Figure 7:
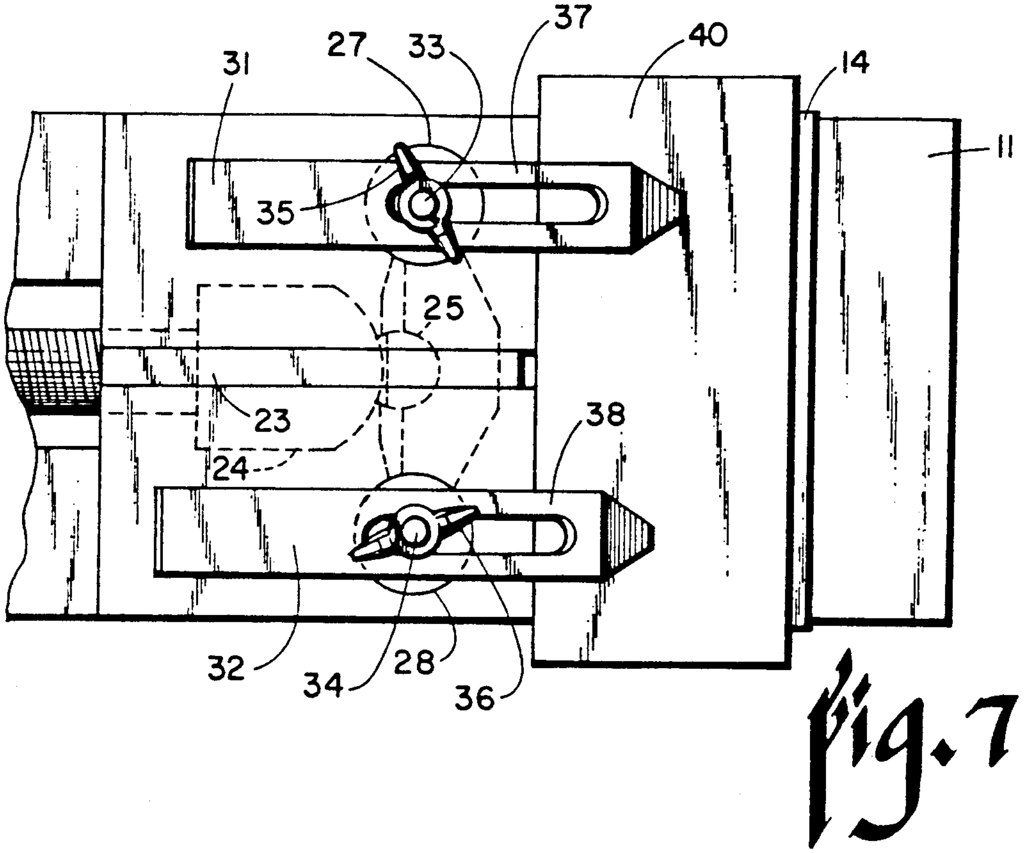
FIG. 7 is a plan view of the vise illustrating the use of finger clamps to hold a workpiece in position.
Figure 8:
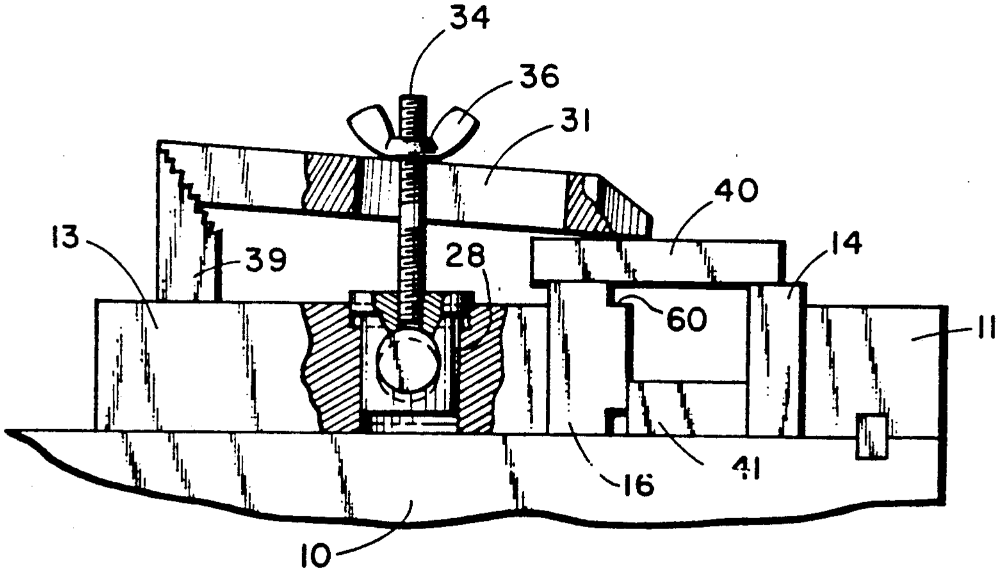
FIG. 8 is an elevation view, partly broken away, of the vise as shown in FIG. 7.

FIGS. 7 and 8 show applications of this invention in connection with the holding of relatively thin workpieces 40 against the top of the jaws 12 and 13 or face plates 15 and 16. The clamping arrangements of FIGS. 7 and 8 employ finger clamps 31 and 32 secured to the pistons 27 and 28, respectively, by threaded shafts 33 and 34 which are threaded into the central holes of the pistons 27 and 28. The clamping fingers 31, 32 are each secured in place and downwardly biased on top of a workpiece by means of a screw assembly that passes through slots 37 and 38 provided in finger clamps 31 and 32 and is tightened against the fingers 31 and 32 with wingnuts 35 and 36. The finger clamps are supported from the rear via a step support 39 and adjusted by movement of this end of the finger clamp along said stepped support 39 as shown in FIG. 8. Springs 58 (illustrated in FIG. 16) can also be employed to bias the fingers 31 and 32 upwardly. The engagement of the sloping surface 29 cf the headpiece 24 with the sloping surface 30 of the cylindrical member 25 produces a downward thrust on the yoke 26 that pulls the fingers 31 and 32 downward against the workpiece 40. The downward pressure on the fingers 31 and 32 is thus increased and the workpiece 40 is held more securely when the vise is tightened. Please note in FIG. 8 that notched steps 60 are provided in the top of each face plate 14, 15 and 16. These notched steps 60 serve to support workpieces on the top thereof such that a workpiece may be firmly held between these steps 60 and the finger clamps that are tightened from above. A three axes clamping of an object (face, end and top) is therefore possible or any combination thereof. It is also possible to totally enclose an entire workpiece (or any desired portion thereof) within the vise using this three axis clamping technique. FIG. 8 illustrates the support of thin workpieces when resting upon the top of the face plates 14 and 16 but the thin workpiece may also seat upon the notched step 60 such that it is firmly held upon the notched step as mentioned above. When thin workpieces are clamped they must be positioned between an anvil plate on the bottom and a mask on the top such that the thin workpiece will be protected from bowing and bending.

As stated previously, the yoke 26 has both of its cylindrical arms extending into the openings provided in piston cylinders 27 and 28. The yoke is movable longitudinally, its ends being slidable with respect to the cylinders 27 and 28. This construction provides freedom of movement of the ends of the yoke within the cylinders and an automatic adjustment for any position which the yoke may take. This construction compensates for the changing linear distance between pistons 27 and 28 when the jaws are offset and assures a smooth movement of the yoke, without binding, in various positions during the operation of the vise. The yoke ends are thus free to move longitudinally within the cylinders 27 and 28 as the yoke rotates from the position of FIG. 4 to either of the positions illustrated in FIGS. 5 and 6.

Figure 9:
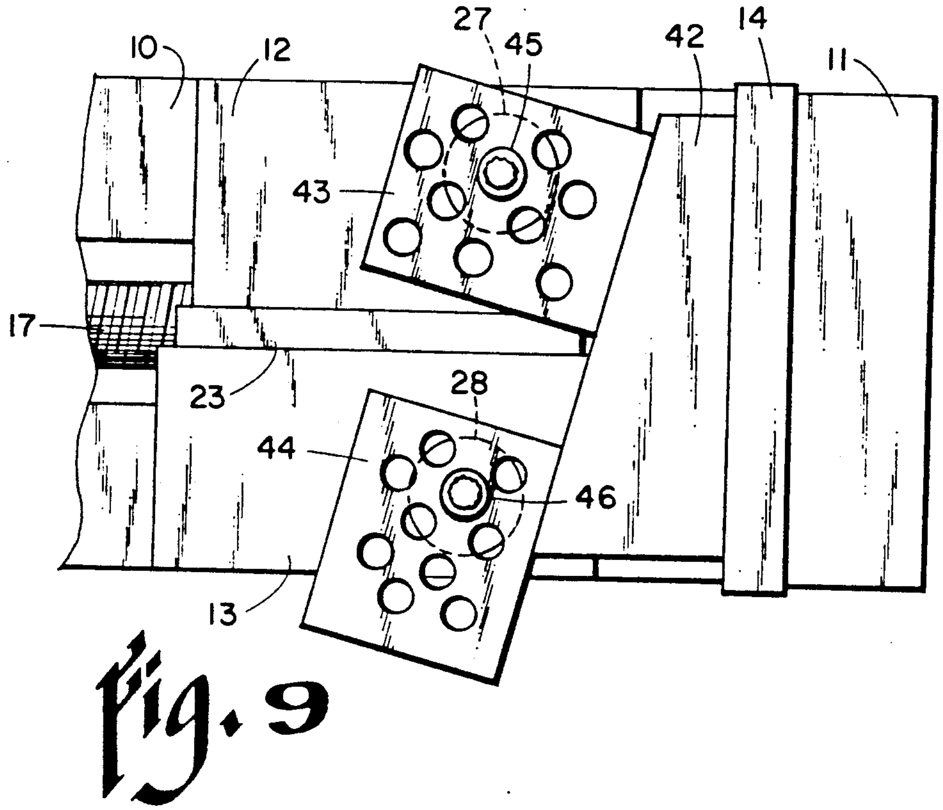
FIG. 9 is a plan view illustrating the use of angle adjustable fittings on both jaws for holding an angular workpiece in engagement with the stationary jaw.
Figure 10:
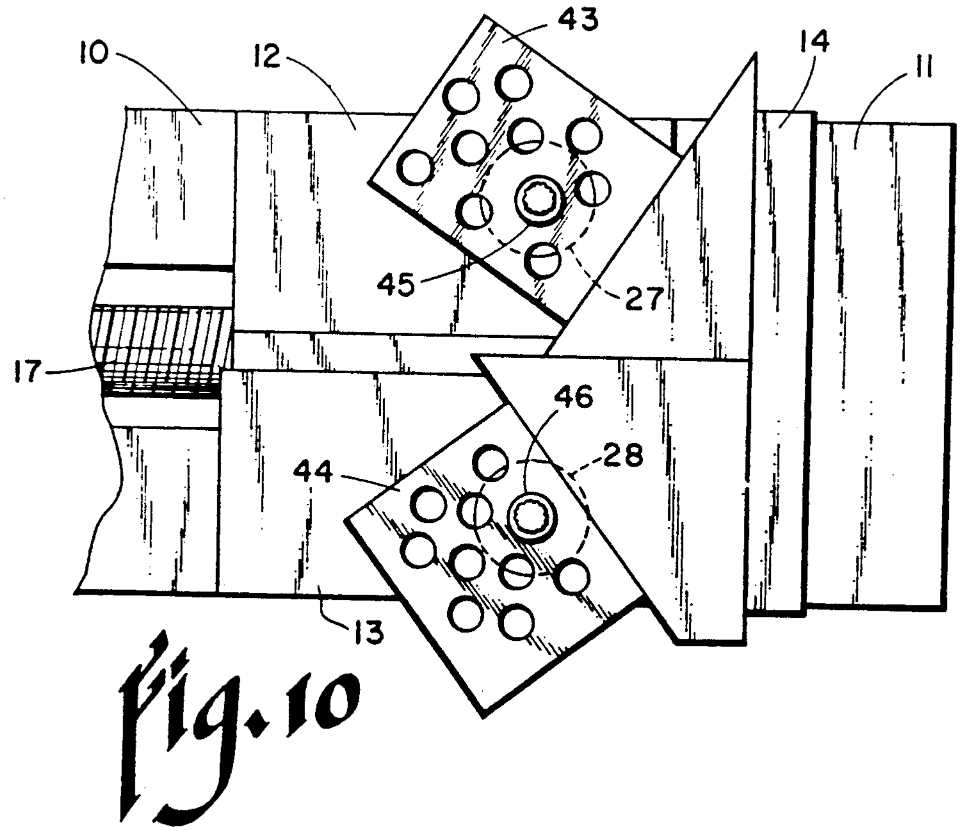
FIG. 10 is a plan view similar to FIG. 9 illustrating the use of angular adjustable fittings for holding separate workpieces against the stationary jaw.

FIGS. 9 and 10 illustrate the manner in which the vise may be employed for holding a workpiece, or workpieces, having offset or angular sides or an arcuate profile. As illustrated in FIG. 9, a singular workpiece 42 having angular, non-parallel sides may be placed in the vise with one side against the face plate 14 and its other side engaged by two fittings 43 and 44. These fittings 43, 44 are pivotally connected to jaws 12 and 13, respectively, by bolts or screws 45 and 46, inserted into the threaded openings provided in the pistons 27 and 28. Each of the fittings 43, 44 has been provided with a plurality of holes, e.g. ten, selectively spaced throughout each fitting such that a wide range of securing positions is available. The two fittings 43 and 44 will be moved to selected hole positions and secured in position by bolts 45 and 46 so that both of the fittings rest against the sloping side of the workpiece 42. The large number of holes and their arrangement about the area of the fittings makes it probable that a position of the fitting can be obtained which will enable the fitting to be aligned with the angular or irregular wall of any workpiece. In any event, a fitting may be selected or made to fit the requirements of a specific workpiece. When the fittings are in position, the jaws may be operated to secure the workpiece firmly between the fittings and the face plate 14 to securely hold the workpiece, for example, for machining. In FIG. 10, each fitting 43, 44 is applied to a separate generally triangular workpiece and the two fittings when pressed towards the face plates will also be pressed towards one another and held firmly in position ready for the milling operation. When clamping a workpiece, the fittings and diverse clamps are pulled down tightly against the movable jaws via a camming action transferred from the headpiece through the yoke, piston, studs and wingnut (shown in FIGS. 8 and 16) to prevent the yawing or canting of said fittings or diverse clamps. The downward motion and pressure is passed through the retaining studs, i.e. the bolts or screws secured to the pistons, locking the fittings tightly against the sliding jaws simultaneously as the vise is closed on the workpieces. The use of fittings such as 43 and 44 makes it possible to secure a wide range of shapes and sizes of workpieces in position on the vise. Obviously, special cases may arise in which it is necessary to provide a fitting or fittings constructed for the purpose at that time.

Figure 11:
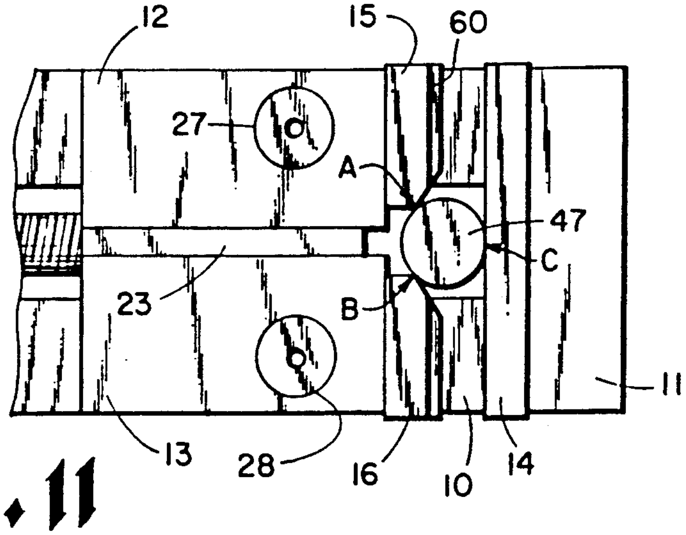
FIG. 11 is a plan view illustrating the holding of a cylindrical workpiece by moving both jaws of the vise to form a three point contact.
Figure 12:
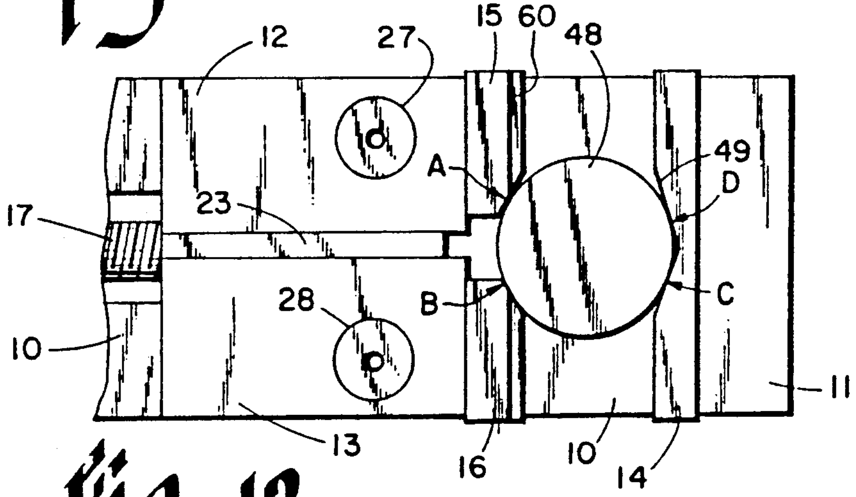
FIG. 12 is a plan view similar to FIG. 11 showing the holding of a cylindrical workpiece by four point engagement against a grooved plate.
Figure 13:
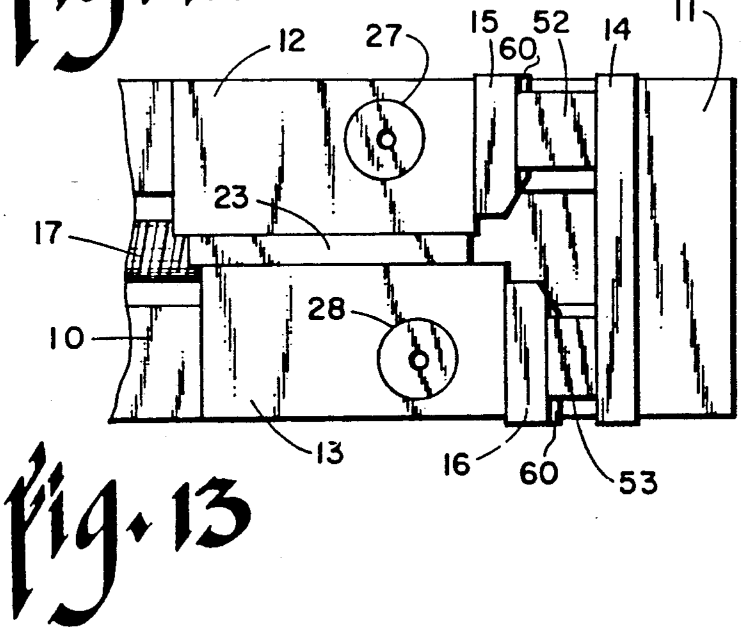
FIG. 13 is a plan view similar to FIGS. 11 and 12 illustrating the holding of two diversely sized rectangular workpieces at the same time.

The machine vise of this invention, as illustrated in FIG. 1, may be employed for a wide range of workpieces such as those illustrated, for example, in FIGS. 11, 12 and 13. The vise of FIG. 11 is shown holding a cylindrical workpiece 47 which is engaged at three points, A, B, C, and securely held by the forward movement of the jaws 12 and 13. This arrangement provides a firm three point engagement for holding the workpiece 47 in readiness for machining.

FIG. 12 illustrates an arrangement for providing a four point contact, A, B, C, D, and gripping of a cylindrical workpiece 48. As shown, the workpiece 48 is engaged by the two face plates 15 and 16 and by the sides of a notch or trough 49 formed in the face plate 14. The notched configuration of the face plate 14 provides two points of engagement with the cylinder 48 as indicated at points C and D.

FIG. 13 illustrates the use of the face plates of this invention for holding two rectangular workpieces 52 and 53 of different sizes. As shown in this figure, two workpieces, 52 and 53, are positioned in engagement with the face plates 15 and 16, respectively. The jaws are closed to move towards the workpieces. The yoke 26 functions to allow the two jaws 12 and 13 to move translationally forward until they contact their respective workpieces 52 and 53 whereupon they hold the workpieces 52 and 53 equally securely in position as illustrated in this figure. Please note also in FIG. 13, that each workpiece 52 and 53 may rest upon the notched steps 60 provided in face plates 15 and 16 or simply be positioned between the parallel jaws.

FIGS. 14 and 15 illustrate an additional clamping device utilized to clamp small pieces in readiness for machining by using diverse clamps 54 and 55. As shown, the clamps 54 and 55 have cut out c-sections on the end thereof and are pivotally attached to pistons 27 and 28 via wingnuts. A support bar 56 is placed within the opposing c-sections of the clamps 54 and 55. Between support bar 56 and upon the notched step 60 provided in face plate 14 are positioned multiple small workpieces 57 that are to be clamped for machining. As drive shaft 17 turns, a torque is created thereby driving the c-clamp around until it engages the support bar 56. The clamp then pivots around the wingnut until the outermost ends of said c-clamp likewise engage the outermost workpieces being supported. This torque serves to close the clamps such that support bar 56 is firmly secured between clamps 54 and 55 and against the small workpieces 57. In addition, the free ends of each clamp 54 and 55 move inwardly and engage the outermost small workpiece 57 on each end such that all of the workpieces 57 are firmly secured between these clamps. As shown in FIG. 15, the small workpieces are thus pushed together and tightly held due to the forces exerted in all four directions as depicted by the arrows shown in FIG. 15.

FIG. 16 is an exploded assembly drawing of this invention. As shown, the yoke extends into the jaws and into the holes provided in each piston as shown. The spring-loaded finger clamp 38 is attached to the piston via the wingnut shown.

FIGS. 17A-17F disclose the overall versatility of the vise. As shown, it is capable of clamping objects of any shape. FIG. 17A shows the vise clamping a bar having overall uniform dimensions. FIG. 17B discloses the vise clamping two separate objects each having different dimensions. FIG. 17C discloses the vise clamping a single bar comprised of sections of differing width dimensions. FIG. 17D discloses the vise provided with fittings that are utilized to securely hold objects of angular or irregular cross-sections. FIG. 17E discloses the vise clamping a solitary object utilizing only one jaw. FIG. 17F illustrates the spring-loaded finger clamps that are particularly well suited to securely holding a thin metal plate.

While particular forms of this invention have been illustrated, other applications and modifications will occur to those skilled in the art and it is intended by the accompanying claims to cover all modifications possible within the spirit and scope of the invention.

I claim:

1. A vise primarily for securing a workpiece on a milling machine or the like comprising:

a base having a fixed jaw and at least one track extending in a direction substantially perpendicular to said fixed jaw;

two sliding jaws mounted on said base and movable along said track with fixed lateral spacing between said sliding jaws and between each of said sliding jaws and said track;

a yoke having a center with a slanted face and lateral arms extending substantially transversely of said sliding jaws and having its lateral arms pivotally and slidably engaging respective ones of said sliding jaws; and means for moving said yoke and sliding jaws toward said fixed jaw, said means including a headpiece having a slanted face adapted to engage said slanted face of the center of said yoke, and to move the center of said yoke toward said fixed jaw along a line parallel to said track and thereby move said sliding jaws into respective selected positions with respect to said fixed jaw.

2. The vise of claim 1 wherein the fixed lateral spacing is maintained by means of a spacer provided between said sliding jaws to maintain the alignment of the jaws and to prevent any substantial yawing movement of the sliding jaws towards one another.

3. The vise of claim 1 wherein at least one of said sliding jaws have been provided with a face plate.

4. The vise of claim 1 wherein at least one of said sliding jaws have been provided with an opening therein that accommodates the headpiece and said yoke.

5. A vise primarily for securing a workpiece on a milling machine or the like comprising:

a fixed jaw;

at least one track extending in a direction substantially perpendicular to said fixed jaw;

a yoke having a center with a slanted face and two arms extending laterally outward from said center;

a pair of sliding jaws, both of said sliding jaws mounted in a side by side relationship on said track and adapted for independent, translational motion along said track; both of said sliding jaws also having an opening adapted to receive one of the arms of said yoke and to permit rotation of said yoke about its center; and drive means having a shaft attached to a headpiece with a slanted surface that engages said slanted surface of the center of said yoke to adjustably move the center of said yoke toward said fixed jaw.

6. The vise of claim 5 wherein said sliding jaws have a fixed lateral spacing therebetween.

7. The vise of claim 6 wherein said fixed lateral spacing is maintained by means of a spacer provided between said sliding jaws to maintain the alignment of the jaws and to prevent any substantial yawing movement of the sliding jaws towards one another.

8. The vise of claim 5 wherein at least one of said sliding jaws have each been provided with a face plate.

9. The vise of claim 5 wherein said center of said yoke comprises a central cavity containing a rotatable cylindrical member having a slanted surface that engages said slanted surface of said headpiece to drive the yoke forward and downward in response to forward motion of said shaft.

10. A vise primarily for securing a workpiece on a milling machine or the like comprising:

a base having a fixed jaw and at least one track extending in a substantially horizontal direction perpendicular to said fixed jaw;

a yoke having a center having a slanted face and two arms extending laterally outward from said center;

two substantially cylindrical vertical pistons, each of said pistons having a substantially horizontal opening adapted to receive a corresponding one of said yoke arms and to permit a sliding motion between said yoke arms and said respective piston openings;

a pair of sliding jaws, both of said sliding jaws mounted in a side by side relationship on said track and adapted for independent, translational motion along said track; each of said sliding jaws also having a substantially cylindrical vertical opening adapted to receive a corresponding one of said pistons and to permit vertical and rotational movement of said piston with respect to said sliding jaw; and drive means adapted to adjustably move the center of said yoke toward said fixed jaw, said drive means having a complementary slanted face engaging said yoke face and being adapted to exert a downward force on said yoke and said pistons as said workpiece is secured between said fixed jaw and said sliding jaws.

11. The vise of claim 10 wherein said center of said yoke comprises a central cavity containing a rotatable cylindrical member having a slanted face that engages said slanted face of said drive means to drive the yoke forward and downward in response to forward motion of said drive means.

12. The vise of claim 10 wherein said sliding jaws have a fixed lateral spacing therebetween.

13. The vise of claim 12 wherein the fixed lateral spacing is maintained by means of a spacer provided between said sliding jaws to maintain the alignment of the jaws and to prevent any substantial yawing movement of the sliding jaws towards one another.

14. A vise of claim 10 wherein said center of said yoke comprises a central cavity containing a rotatable cylindrical member having a slanted face adapted to engage said slanted face of said drive means.

* * * * *